No. 822,853. PATENTED JUNE 5, 1906.
H. C. CHASE.
UNIVERSAL COUPLING.
APPLICATION FILED NOV. 13, 1905.

WITNESSES
INVENTOR
HERBERT C. CHASE.
BY
ATTY.

UNITED STATES PATENT OFFICE.

HERBERT C. CHASE, OF OAKMONT, PENNSYLVANIA, ASSIGNOR TO CRESCENT FORGINGS COMPANY, OF OAKMONT, PENNSYLVANIA, A CORPORATION OF PENNSYLVANIA.

UNIVERSAL COUPLING.

No. 822,853.      Specification of Letters Patent.      Patented June 5, 1906.

Application filed November 13, 1905. Serial No. 287,101.

*To all whom it may concern:*

Be it known that I, HERBERT C. CHASE, a citizen of the United States of America, residing at Oakmont, in the county of Allegheny and State of Pennsylvania, have invented certain new and useful Improvements in Universal Couplings, of which the following is a specification, reference being had therein to the accompanying drawings.

My invention relates to new and useful improvements in universal couplings, and more particularly in the novel construction and arrangement of parts as will be more fully hereinafter described, and set forth in the claims.

One object of my invention is to produce a simple and accessible universal coupling in which the bearings can be cheaply and easily replaced.

Another object is to protect the bearings from dust and to provide for the storage of sufficient lubricant to automatically supply the bearings for a long period.

Figure 1:
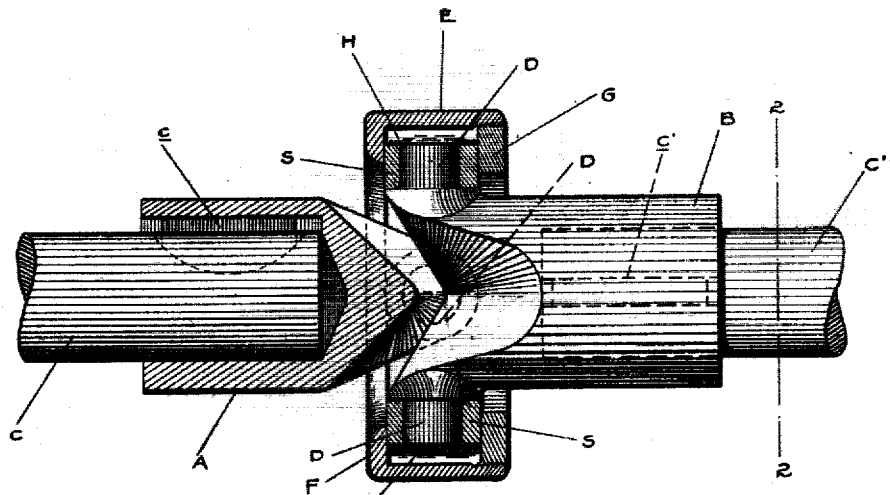
Figure 2:
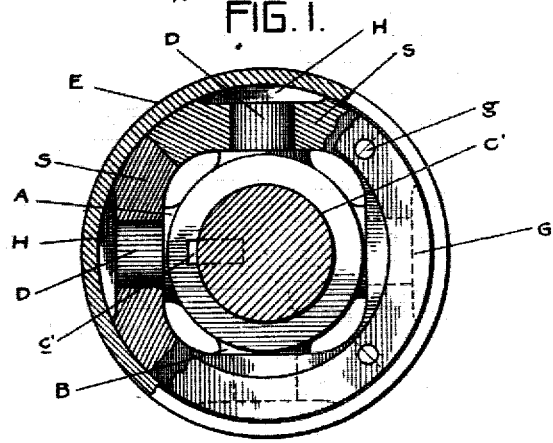
Figure 3:
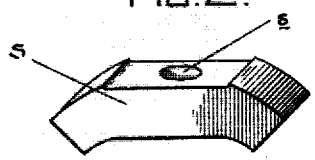

In the drawings, Figure 1 shows a longitudinal central section through the coupling, with one shaft-head in elevation. Fig. 2 is an end view taken on section-line 2 2 of Fig. 1, and Fig. 3 is a perspective of one of the segmental blocks.

A and B are the shaft-heads or knuckles, which I have shown keyed on the shafts C and C′ by means of keys *c c′;* but it is obvious that they may be forged integral with the shafts, if desired. The end of each shaft-head is bifurcated or notched and provided with a trunnion D, projecting transversely from each furcation. Bearings for the trunnions are contained in segmental spacing-blocks S, which are apertured, preferably centrally at *s*, to receive them. Each block is substantially a quadrant, so that when placed together with ends abutting they form a complete circle. In this position they are inclosed in a snugly-fitting annular casing E and are held from lateral movement by the inwardly-extending flange F on one side of the casing and the annular nut G on the other side of the casing. The nut G is provided with apertures *g* to receive the ends of a spanner, and its periphery has a screw-threaded engagement with the interior of the casing E. To form space for grease or other lubricant, I cut away a portion of the outer side of each block adjacent to the bearing to form the space H between the block and the casing. With this construction each bearing is in a separate block and when worn or broken may be easily and cheaply replaced by a new block. By removing the nut G the whole device may be easily dismounted, and when necessary the space H may be filled with grease or other lubricant. The casing is dust-proof, for the reason that the parts may be tightly locked together by the nut G, and for the same reason the lubricant will be retained for a long period.

What I claim as my invention is—

1. In a universal coupling, the combination with a pair of shaft-heads, of trunnions thereon, segmental blocks containing bearings for said trunnions, and a casing and nut inclosing said blocks, substantially as described.

2. In a universal coupling, the combination with a pair of shaft-heads, of trunnions thereon, segmental blocks containing bearings for said trunnions, an annular casing inclosing said blocks, there being an inwardly-extending flange on one side of said casing and a nut engaging the other side, for the purpose described.

3. In a universal coupling, the combination with a pair of shaft-heads, of trunnions thereon, segmental blocks apertured for bearings for said trunnions, an annular casing and a nut therefor inclosing said blocks, portions of the blocks adjacent to the ends of the trunnions being cut away to form lubricant-space, substantially as described.

4. In a universal coupling, the combination with a pair of shafts, of trunnions on the ends thereof, the apertured segment-pieces S, and a housing therefor, substantially as and for the purpose described.

5. In a universal coupling, the combination with a pair of shaft-heads, of trunnions thereon, segmental blocks each containing the bearings for one of said trunnions, said blocks having abutting ends and together forming a complete circle, and retaining means for said blocks.

6. In a universal coupling, the combination with a pair of shaft-heads, of trunnions thereon, spacing-blocks for said trunnions, and an integral annular casing retaining said blocks, portions of said blocks being spaced from said casing, for the purpose described.

7. In a universal coupling, the combination with a pair of shaft-heads, of a pair of oppositely-disposed trunnions on each head, a separate block for each trunnion containing bearings therefor, said blocks having abutting ends and retaining means inclosing said blocks, substantially as described.

8. In a universal joint the combination with a pair of shaft-heads and oppositely-extending trunnions on said heads, of quadrant-blocks, each block containing the bearing for one of said trunnions, and an integral annular casing for holding said blocks end to end.

9. In a universal joint the combination with an annular casing, of a plurality of interchangeable blocks abutting end to end in said casing, and trunnions each having bearings in a single one of said blocks, for the purpose described.

10. In a universal joint the combination with a pair of shafts having ends and oppositely-extending trunnions on each of said ends, of a plurality of abutting blocks each having the entire bearing for one of said trunnions, and retaining means for said blocks, substantially as described.

In testimony whereof I affix my signature in presence of two witnesses.

HERBERT C. CHASE.

Witnesses:
W. A. DIAMOND,
C. G. CONDRON.